US008295407B2

(12) United States Patent
Hsu et al.

(10) Patent No.: US 8,295,407 B2
(45) Date of Patent: Oct. 23, 2012

(54) DECODING METHOD AND APPARATUS FOR INFRARED REMOTE CONTROL COMMANDS

(75) Inventors: Chih Chiang Hsu, Hsinchu Hsien (TW); Yu-Ming Lin, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 578 days.

(21) Appl. No.: 12/541,466

(22) Filed: Aug. 14, 2009

(65) Prior Publication Data

US 2010/0141472 A1 Jun. 10, 2010

(30) Foreign Application Priority Data

Dec. 9, 2008 (TW) ............................... 97147741 A

(51) Int. Cl.
*H04L 27/06* (2006.01)

(52) U.S. Cl. ........................................................ 375/340

(58) Field of Classification Search .................. 375/340
See application file for complete search history.

(56) References Cited

U.S. PATENT DOCUMENTS 4,390,909 A * 6/1983 Sakamoto ....................... 360/71
4,426,662 A 1/1984 Skerlos et al.
6,097,520 A * 8/2000 Kadnier ........................ 398/106
6,351,756 B1 * 2/2002 Taniyoshi ..................... 708/103
2005/0184777 A1 * 8/2005 Stoops et al. ................. 327/172
2006/0274872 A1 * 12/2006 Ikeda et al. ................... 375/355

FOREIGN PATENT DOCUMENTS

JP 2001145184 A * 5/2001

* cited by examiner

*Primary Examiner* — Juan A Torres
(74) *Attorney, Agent, or Firm* — Edell, Shapiro & Finnan, LLC

(57) ABSTRACT

A decoding method and apparatus capable of automatically adjusting a sampling period is provided. The decoding apparatus decodes a serial code including at least one header pulse and a plurality of data pulses. The decoding apparatus includes a detecting unit for detecting the header pulse to generate an initialization signal, a determining unit for determining a sampling period according to the initialization signal and a pulse width of one of the data pulses, and a decoding unit for decoding the data pulses according to the sampling period.

16 Claims, 5 Drawing Sheets

DECODING METHOD AND APPARATUS FOR INFRARED REMOTE CONTROL COMMANDS

CROSS REFERENCE TO RELATED PATENT APPLICATION

This patent application is based on Taiwan, R.O.C. patent application No. 97147741 filed on Dec. 9, 2008.

FIELD OF THE INVENTION

The present invention relates to a decoding method and apparatus for a remote control command, and more particularly, to a method and apparatus for decoding an infrared remote control command by automatically adjusting a sampling period.

BACKGROUND OF THE INVENTION

Infrared or radio frequency (RF) technology is commonly employed for remote control apparatus. At present, the infrared remote control apparatus has advantages of being small in size and having low power consumption and low cost and, as such, is widely used. For example, an infrared remote control apparatus is disclosed in the U.S. Pat. No. 4,426,662.

Generally speaking, an infrared remote control system has a transmitting end and a receiving end. When a command is transmitted between the two ends, coding and decoding standards are needed to effectively transmit and identify the command. For example, an infrared remote control decoding technology applied to the receiving end is disclosed in U.S. Pat. No. 4,426,662. An infrared remote control command has two main classes of coding formats—one class is the RC-5 code and the RECS 80 code widely used in the European regions, and the other class is the NEC code widely used in the Far Eastern regions.

FIG. 1 shows the conventional NEC coding format of an infrared remote control command. The NEC code applies a pulse width modulation (PWM) and comprises a header pulse, a 16-bit user code having an 8-bit user code and an 8-bit user code complement, and a 16-bit data code having an 8-bit data code and an 8-bit data code complement. FIG. 2 shows a format represented by binary bits. A duration of about 1.125 milliseconds (ms), of which the pulse width at the high level is about 0.56 ms and the pulse width at the low level is about 0.56 ms, represents a binary bit “0”. Otherwise, a duration of about 2.25 ms, of which the pulse width at the high level is about 0.56 ms and the pulse width at the low level is about 1.68 ms, represents a binary bit “1”. In addition, for the header pulse, a pulse width is about 9 ms at the high level and 4.5 ms at the low level to make up a duration of about 13.5 ms.

After the transmitting end of the infrared remote control system has transmitted a remote control command, the receiving end has to decode the 16-bit data code and the 16-bit user code of the remote control command, so as to identify the meaning represented by the command. Following description takes the foregoing NEC code as an example to describe a common decoding method. The number of clock cycles between a falling edge and an adjacent rising edge of a waveform of a certain bit of a common serial code, i.e., the number of clock cycles during a low level period, is calculated to identify a corresponding binary command. Suppose a clock cycle is 1 μs, “0” is a duration with a high level of 0.56 ms and a low level of 0.56 ms, and “1” is a duration with a high level of 0.56 ms and a low level of 1.68 ms. When the number of clock cycles between a failing edge and an adjacent rising edge of the waveform is 560 (0.56 ms/1 μs), the corresponding bit is decoded as “0”; when the number of clock cycles between a falling edge and an adjacent rising edge of the waveform is 1680 (1.68 ms/1 μs), the corresponding bit is decoded as “1”. Accordingly, the corresponding binary command is decoded by counting the number of the clock cycles.

It is to be noted that, in the foregoing decoding method, before a value of a data bit is determined, two intervals of the number of clock cycles such as the intervals from 550 to 570 and 1670 to 1690 are defined. When the number of clock cycles between the failing edge and the adjacent rising edge lies within the interval of 550 to 570, it represents the bit value of “0”. Otherwise, when the number of clock cycles between the failing edge and the adjacent rising edge lies within the interval of 1670 to 1690, it represents the bit value of “1”. However, the pulse waveform may be deformed after the infrared remote control command is transmitted. For example, the pulse width may become larger or smaller. Under such circumstances, the prior decoding method using fixed intervals of the number of clock cycles is not able to obtain a correct bit value of the command.

SUMMARY OF THE INVENTION

One object of the present invention is to provide a decoding method and apparatus capable of generating a proper sampling period for decoding an infrared remote control command.

In order to achieve the foregoing object, a decoding method applied to decoding a serial code having a header pulse and a plurality of data pulses is provided according to the present invention. The decoding method comprises steps of receiving a serial code, detecting the header pulse of the serial code, determining a sampling period according to a pulse width of one of the data pulses when the header pulse is detected, and decoding the data pulses according to the sampling period.

In the step of detecting the header pulse, when the pulse width of a pulse width is greater than a predetermined value, the pulse is determined as the header pulse. In the step of decoding the data pulses according to the sampling period, when an interval between one of the data pulses and a next data pulse is less than the predetermined number of the sampling periods, a first bit value is generated; when the interval between the data pulse and the next data pulse is greater than the predetermined number of the sampling periods, a second bit value is generated.

A decoding apparatus for decoding a serial code is provided according to the present invention. The serial code comprises a header pulse and a plurality of data pulses. The decoding apparatus comprises a detecting unit for detecting the header pulse to generate an initialization signal, a determining unit for determining a sampling period according to the initialization signal and a pulse width of one of the data pulses, and a decoding unit for decoding the data pulses according to the sampling period.

In the foregoing apparatus, when the pulse width of a pulse is greater than a predetermined value, the detecting unit determines that the pulse is the header pulse. Preferably, the foregoing decoding apparatus further comprises a memory unit for storing a decoding data outputted by the decoding unit.

According to the abovementioned decoding apparatus and method, a correct bit value of a command can be obtained even when a pulse waveform of an infrared remote control command is deformed during transmission.

DETAILED DESCRIPTION OF THE PREFERRED EMBODIMENT

The following description and figures are provided to gain a better understanding of the foregoing object, functions, characteristics and advantages of embodiments of the present invention.

Figure 1:
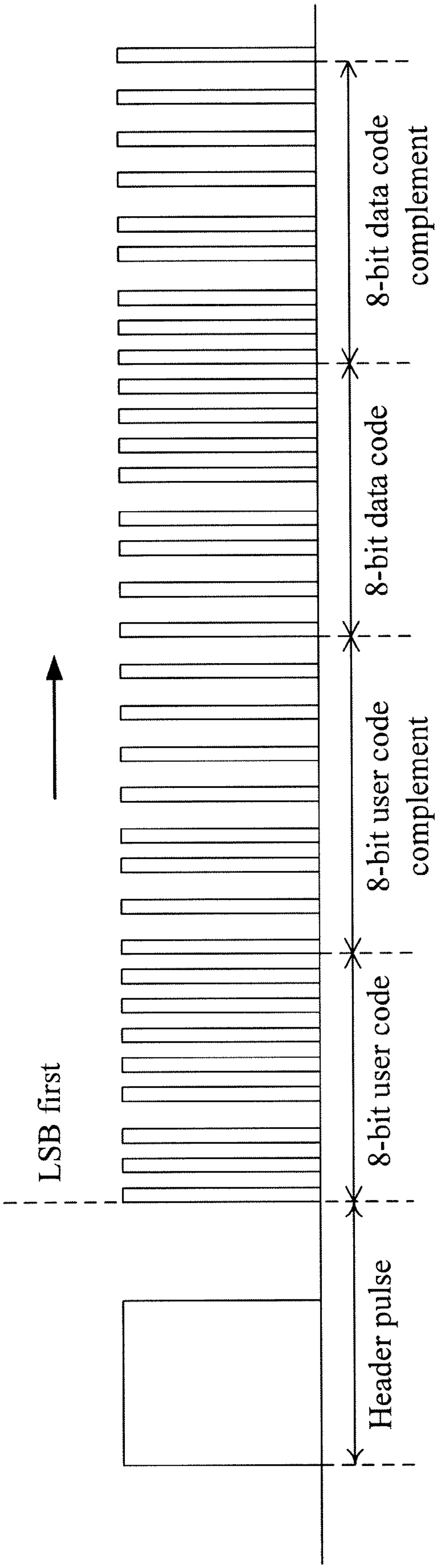
Fig 1 (prior art)
FIG. 1 is a schematic diagram of a prior coding format of an infrared remote control command.
Figure 2:
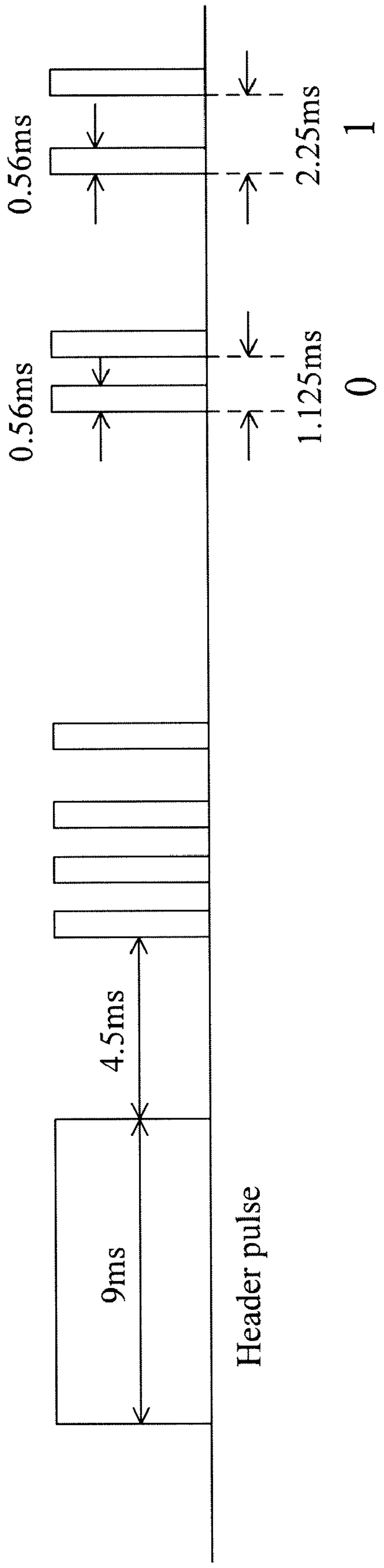
Fig 2 (prior art)
FIG. 2 is a schematic diagram of a coding format in FIG. 1, represented by binary bits.
Figure 3:
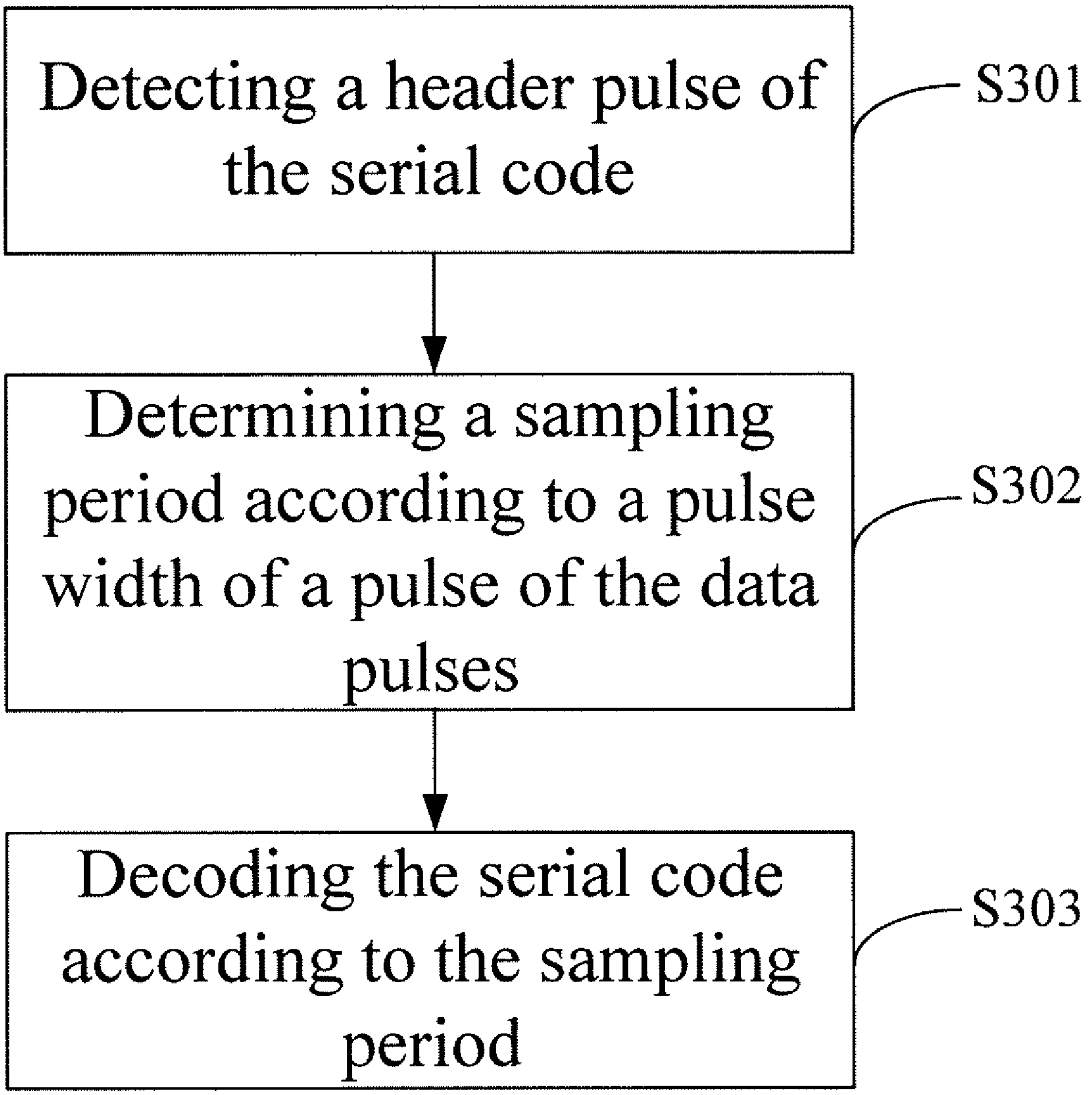
FIG. 3 is a flow chart of a decoding method in accordance with an embodiment of the present invention.

FIG. 3 is a flow chart of a decoding method in accordance with an embodiment of the present invention. For convenience of discussion, the following description takes the NEC code as an example; however, it shall not be construed as limiting.

After a serial code of an infrared remote control command is received, in Step S301, a header pulse of the serial code is detected. Generally speaking, a pulse width of the header pulse of the serial code is several times that of a data pulse. Therefore, when the pulse width of a pulse of the serial code is detected as being much greater than that of the data pulse, the pulse is determined as the header pulse. For example, the pulse width of the header pulse of the NEC code is about 9 ms, and the pulse width of the data pulse is about 0.56 ms. Consequently, when the pulse width (i.e., the high level period) of a pulse is greater than a predetermined value such as 2 ms, the pulse is determined as the header pulse.

In Step S302, a sampling period for decoding the serial code is calculated. When the header pulse is confirmed, the pulse width of the data pulse following the header pulse is calculated and regarded as the sampling period used for decoding data bits of the serial code. With respect to the NEC coding format, since the pulse width of the data pulse during the high level period is fixed, the low level period is modified to represent a binary bit value of "0" or "1". Therefore, the sampling period, i.e., the pulse width of each bit of the serial code during the high level period, is 0.56 ms. In Step S302, when a waveform of the serial code is deformed during transmission, the pulse width of the pulse after being deformed is calculated and regarded as the sampling period for decoding. In this embodiment, the sampling period is obtained by calculating the pulse width of a first data pulse following the header pulse.

Figure 4:
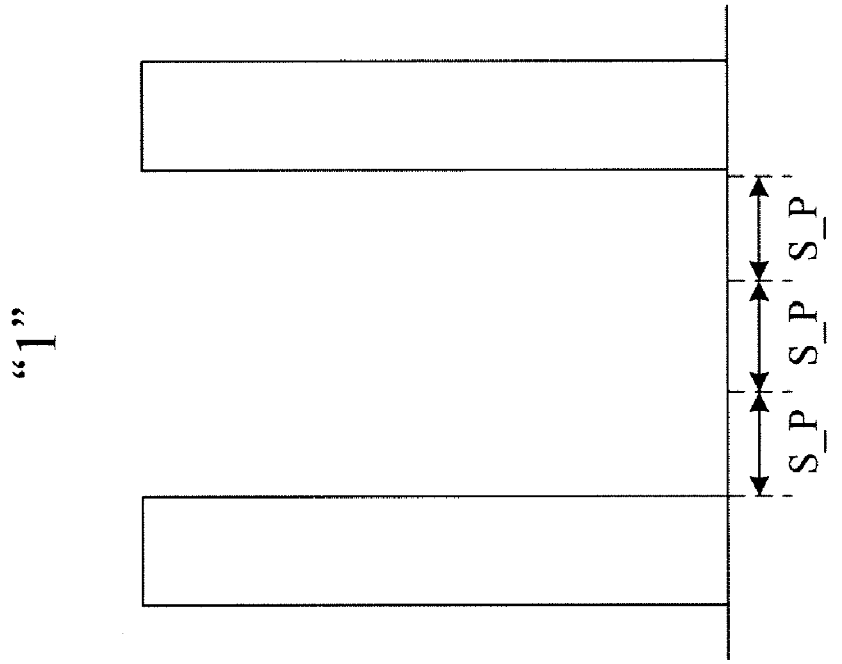
FIG. 4(*a*) and FIG. 4(*b*) respectively show schematic diagrams of a binary decoding method in accordance with an embodiment of the present invention.
Figure 4:
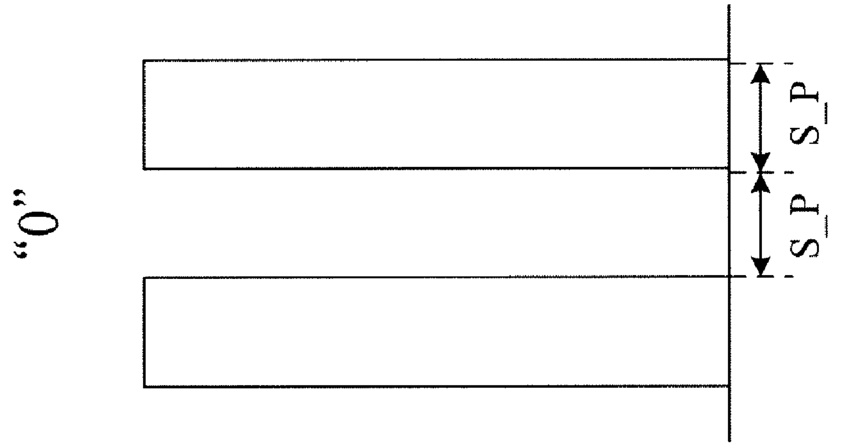

In Step S303, the data bits (i.e., the data pulses) of the serial code are decoded via the sampling period obtained in Step S302. That is, the binary bit value of "0" or "1" represented by a user code or a data code of the serial code is determined. According to this embodiment, in Step S303, the number of sampling periods within an interval between every two pulses of the serial code is detected according to the sampling period. For example, each interval is from a failing edge of a data pulse to a rising edge of an adjacent pulse of the serial code. Referring to FIG. 4(*a*), the data bits of the NEC code are taken as an example. When the interval between two pulses is smaller than 2 sampling periods S_P, the bit represents the binary bit value of "0". Referring to FIG. 4(*b*), when the interval between two pulses is greater than or equal to 2 sampling periods S_P, the bit represents the binary bit value of "1". In another embodiment, the number of sampling periods between a rising edge of a data pulse and a rising edge or a failing edge of an adjacent pulse is detected according to the sampling period to determine the bit value represented by the data bit. According to the decoding method of the present invention, the sampling period used for decoding is generated by a pulse width actually received. Under normal circumstances, even if a waveform of the infrared remote control serial code is deformed during transmission, a pulse of the waveform is deformed in direct proportion. Therefore, by using the sampling period generated according to the pulse width of the pulse having been deformed for decoding, a correct decoding result can still be obtained.

Figure 5:
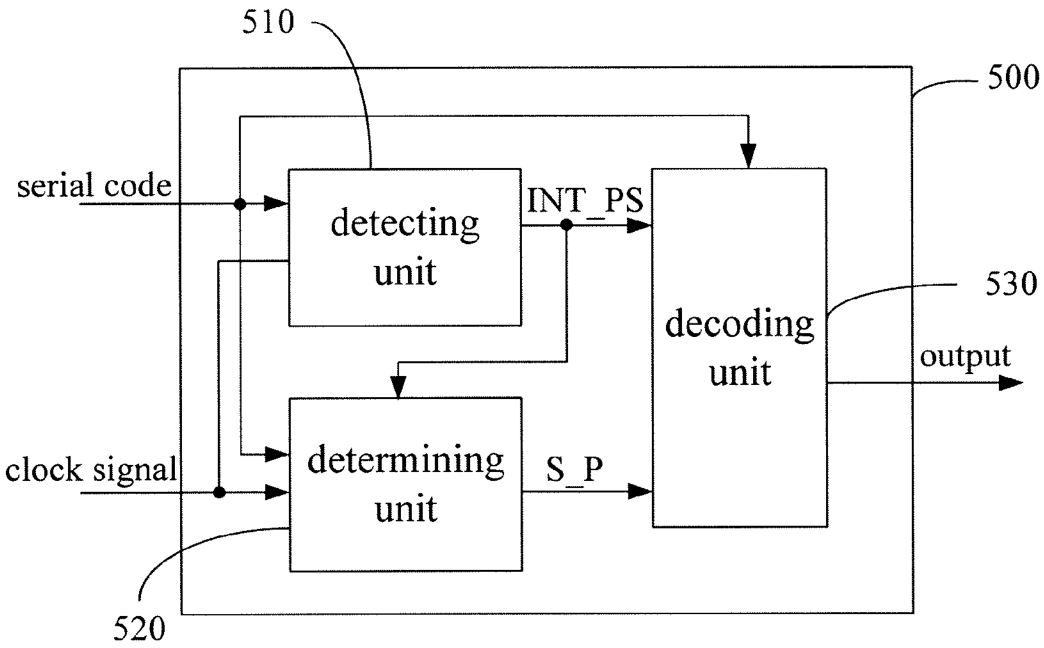
FIG. 5 is a block diagram of a decoding apparatus in accordance with an embodiment of the present invention.

FIG. 5 is a schematic diagram of a decoding apparatus for an infrared remote control command in accordance with an embodiment of the present invention. A decoding apparatus 500 according to the present invention comprises a detecting unit 510, a determining unit 520 and a decoding unit 530. The detecting unit 510 is for detecting a header pulse of a serial code by detecting whether a pulse width of a pulse of the serial code is greater than a predetermined value according to a clock signal. When the pulse width is greater than the predetermined value, it is determined that the pulse is the header pulse. Taking the NEC code as an example, the pulse width of the header pulse during the high level period is 9 ms, and the pulse width of the data pulse during the high level period is 0.56 ms. Therefore, when a pulse width of a pulse is much greater than the pulse width (0.56 ms) of the data pulse, it is determined that the pulse is the header pulse. In this embodiment, the predetermined value is 2 ms. When detecting that a pulse width of a pulse is greater than 2 ms, the detecting unit 510 determines that the pulse is the header pulse. After having detected the header pulse, the detecting unit 510 generates an initialization signal INT_PS for informing the determining unit 520 and the decoding unit 530.

The determining unit 520 calculates a sampling period for decoding the serial code. Upon receiving the initialization signal INT_PS of the detecting unit 510, the determining unit 520 begins to calculate the pulse width of a data pulse following the header pulse. The pulse width is regarded as a sampling period S_P for decoding data bits of the serial code. Taking the NEC code as an example, upon receiving the initialization signal INT_PS, the determining unit 520 begins to calculate the pulse width of a pulse of the serial code; that is, a high level period of the pulse is calculated. In the standard NEC code, the pulse width is 0.56 ms, and accordingly the determining unit 520 calculates and determines a sampling period value of 0.56 ms. However, the infrared remote control command may be disturbed during transmission, resulting in a deformation on pulses of the serial code of the remote control command. At this point, the determining unit 520 still calculates the pulse width of the pulse having been deformed, and the pulse width is regarded as the sampling period S_P. Therefore, the determining unit 520 according to the present invention can calculate a pulse width actually received, and the pulse width of the serial code of the remote control command is regarded as the sampling period for decoding.

The decoding unit 530 decodes binary bit values contained in the serial code. Upon receiving the initialization signal INT_PS from the detecting unit 510, the decoding unit 530 decodes the serial code as received according to the sampling period S_P calculated by the determining unit 520. In an embodiment, the decoding unit 530 detects the number of sampling periods within an interval between every two pulses according to the sampling period S_P to identify a corresponding binary bit value. More specifically, the decoding unit 530 detects the number of sampling periods between a failing edge of a data pulse and a rising edge of an adjacent pulse of the serial code, or detects the number of sampling periods between a rising edge of a data pulse and a rising edge or a failing edge of an adjacent pulse, so as to identify a binary bit value represented by each pulse of the serial code. Take the NEC code in FIG. 4(*a*) as an example. When the number of sampling periods during a failing edge of a data pulse to a rising edge of an adjacent pulse is smaller than 2 sampling periods S_P, the pulse represents a binary bit value "0". Referring to FIG. 4(*b*), when the result is greater than or equal to 2 sampling periods S_P, the pulse represents a binary bit value "1". In addition, the sampling period used by the decoding unit 530 is generated by a pulse width actually received. Therefore, regardless of whether a waveform of the serial code is deformed, the decoding unit 530 is still capable of accurately decoding the serial code as received.

Figure 6:
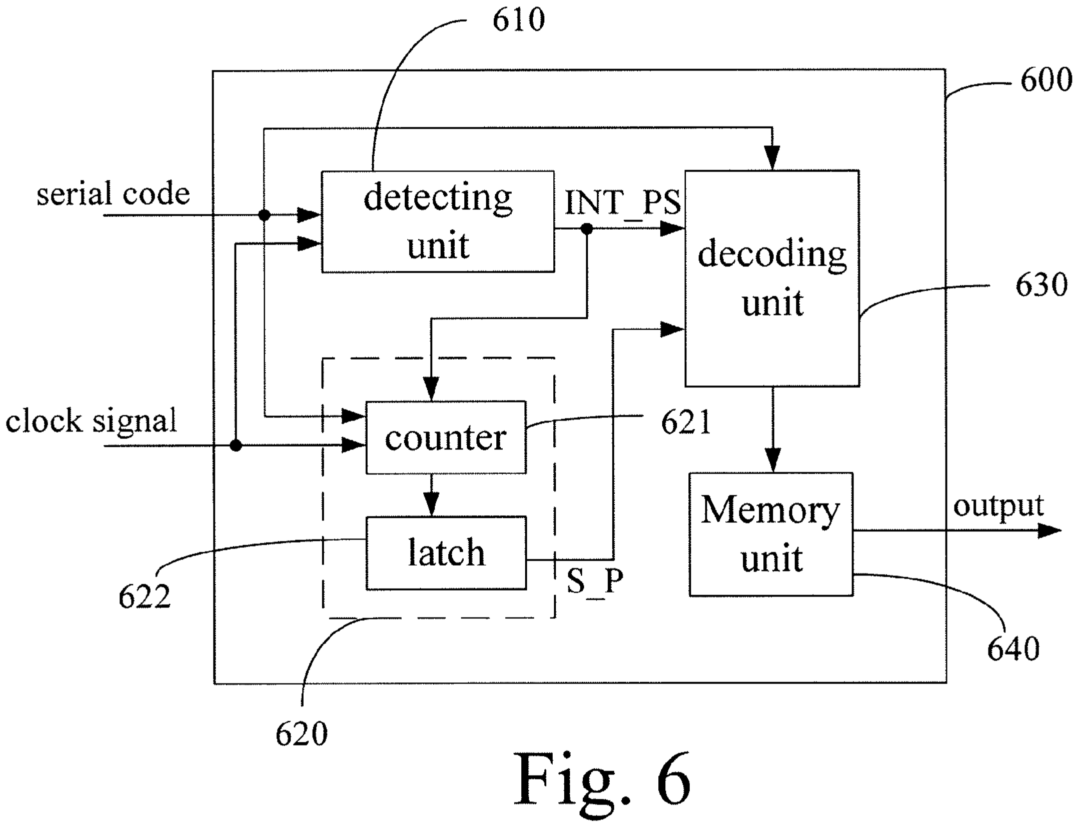
FIG. 6 is a block diagram of a decoding apparatus in accordance with a preferred embodiment of the present invention.

FIG. 6 is a schematic diagram of a decoding apparatus in accordance with a preferred embodiment of the present invention. In a decoding apparatus 600, a detecting unit 610 detects a header pulse of a serial code. When a pulse width of a pulse as detected is greater than a predetermined value, it is determined that the pulse is the header pulse. A decoding unit 630 and a determining unit 620 is informed via an initialization signal INT_PS such that the decoding unit 630 is activated to decode the serial code and the determining unit 620 generates a sampling period according to the serial code and a clock signal. The determining unit 620 comprises a counter 621 and a latch unit 622. After the detecting unit 610 receives the initialization signal INT_PS, the counter 621 calculates the pulse width of a first data pulse following the header pulse according to the clock signal. That is, the number of clocks of the data pulse during the high level period is calculated and provided to the latch unit 622. The latch unit 622 then latches the number of clocks as a sampling period S_P and outputs the sampling period S_P to the decoding unit 630. The decoding unit 630 decodes the data pulse of the serial code according to the sampling period S_P. At this point, the decoding unit 630 temporarily stores a bit value generated by decoding the serial code into a memory unit 640. After the serial code is decoded, the memory unit 640 outputs a complete command value.

In conclusion, according the present invention, a pulse width of a serial code actually received is applied to generate a sampling period, and the serial code is decoded according to the sampling period, thereby solving the problem of decoding a deformed serial code.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A decoding method, for use in a decoder, for decoding a serial code having a header pulse and a plurality of data pulses, the decoding method comprising steps of:

receiving the serial code;

detecting the header pulse of the serial code;

determining a sampling period according to a pulse width of one of the data pulses after the header pulse is detected; and decoding the data pulses according to the sampling period.

2. The decoding method as claimed in claim 1, wherein the step of detecting the header pulse comprises comparing a pulse width of a pulse with a predetermined value to detect the header pulse.

3. The decoding method as claimed in claim 2, wherein in the step of detecting the header pulse, the pulse is determined as the header pulse when the pulse width of the pulse is greater than the predetermined value.

4. The decoding method as claimed in claim 1, wherein the sampling period is equal to the pulse width of the one of the data pulses.

5. The decoding method as claimed in claim 1, wherein the one data pulse is a first data pulse following the header pulse of the serial code.

6. The decoding method as claimed in claim 1, wherein in the step of decoding the data pulses according to the sampling period, a first bit value is generated when an interval between one of the data pulses and a next adjacent data pulse is less than a predetermined number of sampling periods, and a second bit value is generated when the interval between the one of the data pulses and the next adjacent data pulse is greater than the predetermined number of sampling periods.

7. The decoding method as claimed in claim 6, wherein the interval between the one of the data pulses and the next adjacent data pulse is a duration between a failing edge of the one of the data pulses and a rising edge of the next adjacent data pulse.

8. A decoding apparatus, for decoding a serial code having a header pulse and a plurality of data pulses, the decoding apparatus comprising:

a detecting unit, for detecting the header pulse to generate an initialization signal;

a determining unit, for determining a sampling period according to the initialization signal and a pulse width of one of the data pulses; and a decoding unit, for decoding the data pulses according to the sampling period.

9. The decoding apparatus as claimed in claim 8, wherein the detecting unit detects the header pulse according to a predetermined value.

10. The decoding apparatus as claimed in claim 9, wherein when a pulse width of a pulse is greater than the predetermined value, the detecting unit determines the pulse as the header pulse.

11. The decoding apparatus as claimed in claim 8, wherein the sampling period is equal to the pulse width of the one of the data pulses.

12. The decoding apparatus as claimed in claim 8, wherein the determining unit determines the sampling period according to a first data pulse following the header pulse of the serial code.

13. The decoding apparatus as claimed in claim 8, wherein the decoding unit generates a first bit value when an interval between one of the data pulses and a next adjacent data pulse is less than a predetermined number of the sampling periods, and the decoding unit generates a second bit value when the interval between the one of the data pulses and the next adjacent data pulse is greater than the predetermined number of the sampling periods.

14. The decoding apparatus as claimed in claim 13, wherein the interval between the one of the data pulses and the next adjacent data pulse is a duration between a failing edge of the one of the data pulses and a rising edge of the next adjacent data pulse.

15. The decoding apparatus as claimed in claim 8, further comprising:

a memory unit, for storing a decoded data outputted by the decoding unit.

16. The decoding apparatus as claimed in claim 8, wherein the determining unit comprises:

a counter, for calculating the pulse width of the one of the data pulses according to the initialization signal and a clock signal; and a latch unit, for latching a count value generated by the counter.

* * * * *